United States Patent
Naumanen et al.

(10) Patent No.: US 10,422,277 B2
(45) Date of Patent: Sep. 24, 2019

(54) DEVICE AND A METHOD FOR CONTROLLING AN ELECTROMECHANICAL POWER TRANSMISSION CHAIN

(71) Applicant: Visedo Oy, Lappeenranta (FI)

(72) Inventors: Ville Naumanen, Lappeenranta (FI); Antti Tarkiainen, Lappeenranta (FI); Risto Tiainen, Pulp (FI)

(73) Assignee: DANFOSS MOBILE ELECTRIFICATION OY, Lappeenranta (FI)

( * ) Notice: Subject to any disclaimer, the term of this patent is extended or adjusted under 35 U.S.C. 154(b) by 0 days.

(21) Appl. No.: 15/825,180

(22) Filed: Nov. 29, 2017

(65) Prior Publication Data

US 2018/0156107 A1 Jun. 7, 2018

(30) Foreign Application Priority Data

Dec. 7, 2016 (EP) ..................... 16202791

(51) Int. Cl.
*F02B 63/04* (2006.01)
*B60K 6/48* (2007.10)
(Continued)

(52) U.S. Cl.
CPC .............. *F02B 63/042* (2013.01); *B60K 6/48* (2013.01); *B60W 10/06* (2013.01); *B60W 10/08* (2013.01);
(Continued)

(58) Field of Classification Search
CPC .......... B60W 10/08; B60W 2710/083; B60W 20/00; B60W 2510/083;
(Continued)

(56) References Cited

U.S. PATENT DOCUMENTS 6,522,024 B1* 2/2003 Takaoka ................. B60K 6/445
290/40 C
2006/0106520 A1* 5/2006 Bodin ..................... B60T 7/122
701/67

(Continued)

FOREIGN PATENT DOCUMENTS

DE 10 2013 004033 A1 9/2014
EP 2 733 007 A1 5/2014

OTHER PUBLICATIONS

Zhumu Fu et al.: "Torque Split Strategy for parallel Hybrid Electric Vehicles with an Integrated Starter Generator", Discrete Dynamics in Nature and Society, vol. 2014, Jan. 1, 2014, pp. 1-10, XP055374525.

(Continued)

*Primary Examiner* — Long T Tran
(74) *Attorney, Agent, or Firm* — Young & Thompson

(57) ABSTRACT

An electromechanical power transmission chain comprises an electric machine (110) mechanically connectable to a combustion engine (111) and to one or more actuators (114) to be driven, an energy-storage (118) for storing electric energy, converter equipment (115) for driving the electric machine in a torque controlled mode when transferring electric energy between the electric machine and the energy-storage, and a device (101) for producing a torque reference for the electric machine. The device produces a control value based on electric energy stored by the energy-storage so that the control value is a decreasing function of the stored electric energy, and produces the torque reference based on a difference between the control value and a control signal indicative of torque produced by the combustion engine.

10 Claims, 2 Drawing Sheets

(51) Int. Cl.
*B60W 10/06* (2006.01)
*B60W 10/08* (2006.01)
*B60W 10/26* (2006.01)
*B60W 20/10* (2016.01)
*B60W 50/00* (2006.01)

(52) U.S. Cl.
CPC ............ *B60W 10/26* (2013.01); *B60W 20/10* (2013.01); *B60W 2050/001* (2013.01); *B60W 2050/0011* (2013.01); *B60W 2510/0657* (2013.01); *B60W 2510/244* (2013.01); *B60W 2710/0666* (2013.01); *B60W 2710/083* (2013.01); *Y02T 10/6221* (2013.01); *Y02T 10/6286* (2013.01)

(58) Field of Classification Search
CPC ......... B60W 2710/0666; B60W 10/26; B60W 2710/1022; B60W 2050/001; B60W 2050/0011; B60K 6/48; B60K 2006/4825
See application file for complete search history.

(56) References Cited

U.S. PATENT DOCUMENTS

| | | | | |
|---|---|---|---|---|
| 2007/0227792 A1* | 10/2007 | Yonemori | ................ | B60K 6/26 180/65.31 |
| 2007/0278021 A1 | 12/2007 | Pott et al. | | |
| 2010/0001583 A1* | 1/2010 | Ichikawa | ............... | B60L 3/0046 307/10.1 |
| 2010/0160111 A1* | 6/2010 | Yamanaka | ........ | F16H 61/66272 477/45 |
| 2012/0078456 A1* | 3/2012 | Hakumura | ............. | B60L 3/003 701/22 |
| 2012/0203415 A1* | 8/2012 | Akutsu | .................... | B60K 6/26 701/22 |
| 2012/0303189 A1* | 11/2012 | Namuduri | ............. | B60W 20/00 701/22 |
| 2013/0053214 A1* | 2/2013 | Kawai | .................. | B60W 10/02 477/5 |
| 2014/0045649 A1* | 2/2014 | Yoshida | .................. | B60K 6/48 477/5 |
| 2014/0062353 A1* | 3/2014 | Oyobe | .................. | H02P 27/085 318/400.02 |
| 2015/0123577 A1* | 5/2015 | Omata | .................. | B60L 3/0061 318/400.02 |
| 2016/0039417 A1 | 2/2016 | Barthel et al. | | |
| 2016/0250929 A1* | 9/2016 | Nakano | .................. | B60L 3/102 701/22 |

OTHER PUBLICATIONS

EP Search Report, dated May 22, 2017, from corresponding EP 16 20 2791 application.

* cited by examiner

DEVICE AND A METHOD FOR CONTROLLING AN ELECTROMECHANICAL POWER TRANSMISSION CHAIN

FIELD OF THE DISCLOSURE

The disclosure relates to a device for controlling an electromechanical power transmission chain. Furthermore, the disclosure relates to a method and to a computer program for controlling an electromechanical power transmission chain.

BACKGROUND

In many cases, an electromechanical power transmission chain is a parallel power transmission chain where an electric machine is mechanically connected to a combustion engine and also to one or more actuators to be driven. An actuator can be for example a wheel, a chain track, a hydraulic pump, or another device to be driven with mechanical power. The electromechanical power transmission chain comprises an energy-storage for storing electric energy and converter equipment for transferring electric energy between the energy-storage and the electric machine. The electric machine operates sometimes as a generator which charges the energy-storage, and sometimes as an electric motor which receives electric energy from the energy-storage and assists the combustion engine when high mechanical output power is needed.

An inherent challenge related to parallel power transmission chains of the kind described above is the need to control the combustion engine and the electric machine so that mechanical load constituted by one or more actuators being driven is shared dynamically in an appropriate way between the combustion engine and the electric machine. Different approaches for mechanical load sharing have been studied and published. For example, the publication Fu, Z., Gao, A., Wang, X., and Song, X.: *Torque Split Strategy for Parallel Hybrid Electric Vehicles with an Integrated Starter Generator, Discrete Dynamics in Nature and Society* Volume 2014, Article ID 793864, describes mechanical load sharing implemented with a fuzzy logic controller. The fuzzy logic controller uses the torque of a combustion engine, the state of charge of an energy-storage, and the rotational speed of the combustion engine as input quantities, and determines torque sharing between the combustion engine and the electric machine in accordance with pre-determined fuzzy logic rules. The approach based on fuzzy logic is however quite complex. Furthermore, finding a suitable set of fuzzy logic rules may require a significant amount of effort and experiments.

SUMMARY

The following presents a simplified summary in order to provide a basic understanding of some aspects of various invention embodiments. The summary is not an extensive overview of the invention. It is neither intended to identify key or critical elements of the invention nor to delineate the scope of the invention. The following summary merely presents some concepts of the invention in a simplified form as a prelude to a more detailed description of exemplifying embodiments of the invention.

In accordance with the invention, there is provided a new device for controlling an electromechanical power transmission chain that is a parallel power transmission chain where an electric machine is mechanically connected to a combustion engine and to one or more actuators to be driven.

A device according to the invention comprises:
- a first input interface for receiving a first control signal indicative of torque produced by the combustion engine,
- a second input interface for receiving a second control signal indicative of electric energy stored by an energy-storage of the electromechanical power transmission chain, and
- a regulator element for producing a control value based on the second control signal so that the control value is a decreasing function of the stored electric energy, and for producing a torque reference for the electric machine based on a difference between the first control signal and the control value to control the electric machine to act as: i) an electric motor and reduce a load of the combustion engine a) when there is a sufficient amount of electric energy available in the energy-storage and b) when a power of the combustion engine is above a power level providing an optimal efficiency at a prevailing rotational speed, and ii) a generator and increase the load of the combustion engine c) when the energy-storage is capable of receiving electric energy and d) when the power of the combustion engine is below the power level providing the optimal efficiency at the prevailing rotational speed.

In mechanical load sharing between the combustion engine and the electric machine, the state of charge of the energy-storage is taken into account because the above-mentioned control value is a decreasing function of the stored electric energy. The decreasing function and the production of the torque reference can be designed so that the electric machine acts as an electric motor and reduces the load of the combustion engine if a) there is a sufficient amount of electric energy available in the energy-storage and if b) the power of the combustion engine were otherwise above a power level providing an optimal efficiency at the prevailing rotational speed and, on the other hand, the electric machine acts as a generator and increases the load of the combustion engine if c) the energy-storage is capable of receiving electric energy and if d) the power of the combustion engine were otherwise below the power level providing the optimal efficiency at the prevailing rotational speed. Thus, the electric machine can be controlled so that the operating point of the combustion engine is, at each rotational speed, at or at least closer to the optimal operation point related to the prevailing rotational speed. A description of the operation in different exemplifying situations will be presented in conjunction with exemplifying and non-limiting embodiments of the invention.

In accordance with the invention there is provided also a new electromechanical power transmission chain that comprises:
- an electric machine mechanically connectable to a combustion engine and to one or more actuators to be driven with the electromechanical power transmission chain,
- an energy-storage for storing electric energy,
- converter equipment for transferring electric energy between the electric machine and the energy-storage, the converter equipment being configured to drive the electric machine in a torque controlled mode, and
- a device according to the invention for producing a torque reference of the electric machine.

In accordance with the invention there is provided also a new method for controlling an electromechanical power transmission chain that is a parallel power transmission chain where an electric machine is mechanically connected to a combustion engine and to one or more actuators to be driven.

A method according to the invention comprises:
producing a control value based on electric energy stored by an energy-storage of the electromechanical power transmission chain so that the control value is a decreasing function of the stored electric energy,
producing a torque reference of the electric machine based on a difference between a control signal and the control value, the control signal being indicative of torque produced by the combustion engine, and
transferring electric energy between the electric machine and the energy-storage, and driving the electric machine as a motor or as a generator in a torque controlled mode when transferring the electric energy between the electric machine and the energy-storage and between the energy-storage and the electric machine.

In accordance with the invention there is provided also a new computer program for controlling an electromechanical power transmission chain that is a parallel power transmission chain where an electric machine is mechanically connected to a combustion engine and to one or more actuators to be driven.

A computer program according to the invention comprises computer executable instructions for controlling a programmable processor to:
produce a control value that controls an electromechanical power transmission chain that is a parallel power transmission chain where an electric machine is mechanically connected to a combustion engine and to one or more actuators to be driven, the control value based on electric energy stored by an energy-storage of the electromechanical power transmission chain so that the control value is a decreasing function of the stored electric energy, and
produce a torque reference used for controlling the electric machine as a motor or as a generator, the torque reference based on a difference between a control signal and the control value, the control signal being indicative of torque produced by the combustion engine.

A computer program product according to the invention comprises a non-volatile computer readable medium, e.g. a compact disc "CD", encoded with a computer program according to the invention.

A number of exemplifying and non-limiting embodiments of the invention are described in accompanied dependent claims.

Various exemplifying and non-limiting embodiments of the invention both as to constructions and to methods of operation, together with additional objects and advantages thereof, will be best understood from the following description of specific exemplifying and non-limiting embodiments when read in connection with the accompanying drawings.

The verbs "to comprise" and "to include" are used in this document as open limitations that neither exclude nor require the existence of un-recited features. The features recited in dependent claims are mutually freely combinable unless otherwise explicitly stated. Furthermore, it is to be understood that the use of "a" or "an", i.e. a singular form, throughout this document does not exclude a plurality.

BRIEF DESCRIPTION OF THE FIGURES

Exemplifying and non-limiting embodiments of the invention and their advantages are explained in greater detail below in the sense of examples and with reference to the accompanying drawings, in which.

DESCRIPTION OF THE EXEMPLIFYING EMBODIMENTS

The specific examples provided in the description given below should not be construed as limiting the scope and/or the applicability of the appended claims. Lists and groups of examples provided in the description given below are not exhaustive unless otherwise explicitly stated.

Figure 1:
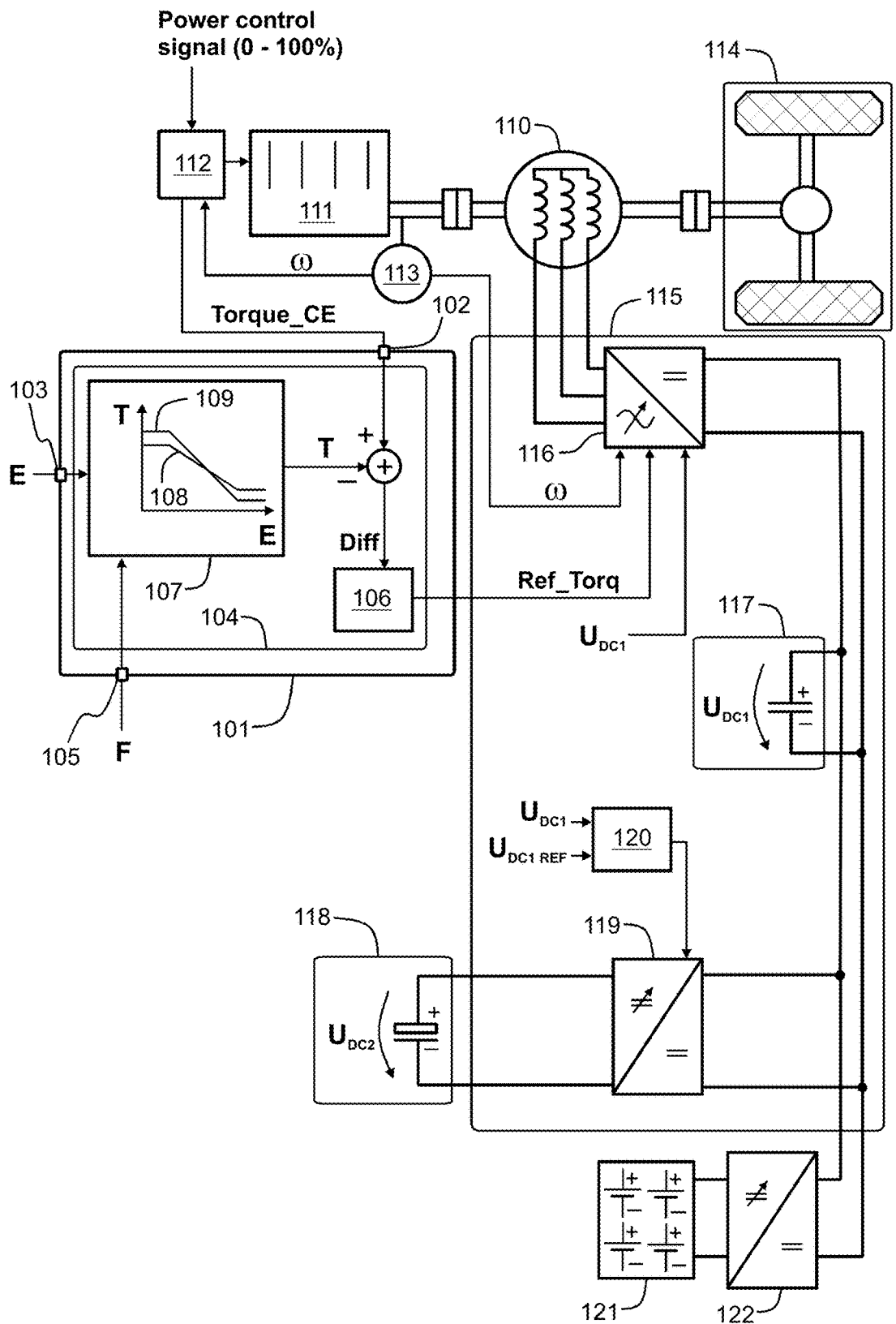
FIG. 1 shows a schematic illustration of an electromechanical power transmission chain according to an exemplifying and non-limiting embodiment of the invention.

FIG. 1 shows a schematic illustration of an electromechanical power transmission chain that comprises a device 101 according to an exemplifying and non-limiting embodiment of the invention. The electromechanical power transmission chain comprises an electric machine 110 that is mechanically connected to a combustion engine 111 and to an actuator 114. The electric machine 110 operates sometimes as a generator which produces electric energy, and sometimes as an electric motor which consumes electric energy and assists the combustion engine 111 when high mechanical output power is needed. In this exemplifying case, the actuator 111 comprises wheels of e.g. a vehicle or a mobile working machine. The actuator could as well comprise for example one or more chain tracks, one or more hydraulic pumps, and/or one or more other devices to be driven with mechanical power.

The electromechanical power transmission chain comprises an energy-storage 118 for storing electric energy. The energy-storage 118 may comprise for example one or more electric double-layer capacitors "EDLC". In many contexts, an electric double-layer capacitor is called a "super capacitor". The electromechanical power transmission chain comprises converter equipment 115 for transferring electric energy between the electric machine 110 and the energy-storage 118. The converter equipment 115 is configured to drive the electric machine 110 in a torque controlled mode. The electric machine 110 can be for example an electrically excited synchronous machine, a permanent magnet synchronous machine, an asynchronous machine, or a reluctance machine. The electric machine 110 can be an asynchronous machine or a reluctance machine in cases where the converter equipment 115 is capable of supplying reactive power to the electric machine 110, or there are other means for supplying reactive power to the electric machine 110. It is also possible that an electromechanical power transmission chain according to an exemplifying and non-limiting embodiment of the invention comprises a direct current "DC" machine. The electromechanical power transmission chain may further comprise a battery element 121 and a direct voltage converter 122 for charging and discharging the battery element 121.

In the exemplifying electromechanical power transmission chain illustrated in FIG. 1, the converter equipment 115 comprises a capacitive circuit 117 and a converter stage 116 for transferring electric energy from the electric machine 110 to the capacitive circuit 117 when the electric machine 110 acts as a generator and for transferring electric energy from the capacitive circuit 117 to the electric machine 110 when the electric machine 110 acts an electric motor. The converter stage 116 can be for example a pulse width modulation "PWM" converter stage. The converter equipment 115 comprises a direct voltage converter 119 for transferring electric energy between the capacitive circuit 117 and the energy-storage 118 so as to keep the direct voltage $U_{DC1}$ of the capacitive circuit 117 in a pre-determined voltage range. The converter equipment 115 may comprise for example a proportional and integrative "PI" controller 120 which receives a measured value of the direct voltage $U_{DC1}$ and which tries to keep the direct voltage $U_{DC1}$ at its reference value $U_{DC1\_REF}$ by controlling the operation of the direct voltage converter 119. The converter stage 116 can be configured to provide over-voltage protection so that the converter stage 116 is configured to reduce electric power produced by the electric machine 110 in response to a situation in which the direct voltage $U_{DC1}$ exceeds a predetermined over-voltage limit. Furthermore, the converter stage 116 can be configured to provide under-voltage protection so that the converter stage 116 is configured to reduce electric power supplied to the electric machine 110 in response to a situation in which the direct voltage $U_{DC1}$ falls below a predetermined under-voltage limit.

The direct voltage converter 119 is a bidirectional converter capable of transferring electric energy to and from the energy-storage 118. In cases where the direct voltage $U_{DC1}$ of the capacitive circuit 117 is higher than the direct voltage $U_{DC2}$ of the energy-storage 118, the direct voltage converter 119 can be implemented for example with one or more inverter branches of an inverter bridge and with one or more inductor coils so that the direct voltage poles of each inverter branch are connected to the capacitive circuit 117, the alternating voltage pole of each inverter branch is connected via an inductor coil to the positive pole of the energy-storage 118, and the negative pole of the energy-storage 118 is connected to the negative direct voltage pole of each inverter branch. It is to be however noted that the direct voltage converter 119 can be implemented in many different ways.

In the exemplifying electromechanical power transmission chain illustrated in FIG. 1, the combustion engine 111 is controlled by an externally given power control signal. In this exemplifying case, an engine controller 112 controls the combustion engine 111 based on the power control signal and measured rotational speed ω of the combustion engine 111. The rotational speed ω is measured with a rotational speed sensor 113. The engine controller 112 may determine for example the fuel and air supply of the combustion engine 111 in accordance with the power control signal and the rotational speed ω. The engine controller 112 produces a first control signal Torque_CE that is indicative of torque produced by the combustion engine 111. The control signal Torque_CE can be produced for example with the aid of a lookup table which returns the control signal Torque_CE when the prevailing fuel and air supply and the rotational speed ω are used as lookup keys. The lookup table or data for constructing the lookup table is typically provided by a manufacturer of the combustion engine. The control signal Torque_CE can be for example a relative value that expresses the torque of the combustion engine 111 as a percentage of the maximum torque that is achievable at the prevailing rotational speed.

The device 101 comprises a first input interface 102 for receiving the above-mentioned control signal Torque_CE that is indicative of the torque produced by the combustion engine 111. The device 101 comprises a second input interface 103 for receiving a second control signal E that is indicative of the electric energy stored by the energy-storage 118. The control signal E can be for example a measured value of the direct voltage $U_{DC2}$ of the energy storage 118. For another example, the control signal E can be $U_{DC2}^2$ which is directly proportional to the electric energy stored by the energy-storage 118. The device 101 further comprises a regulator element 104 for producing a control value T based on the control signal E so that the control value T is a decreasing function of the electric energy stored by the energy-storage 118. In this document, the definition for the decreasing function is that the control value $T_{Emin}$ corresponding to a minimum allowable amount of the stored electric energy is greater than the control value $T_{Emax}$ corresponding to a maximum allowable amount of the stored electric energy i.e. $T_{Emin} > T_{Emax}$, and the control value T decreases or remains constant when the stored electric energy increases. Thus, the control value T does not necessarily need to be a strictly decreasing function of the stored electric energy. The regulator element 104 produces a torque reference Ref_Torq for the electric machine 110 based on a difference Diff between the above-mentioned control signal Torque_CE and the above-mentioned control value T. In this exemplifying case, the regulator element 104 comprises a functional block 107 for producing the control value T and a regulator 106 for producing the torque reference Ref_Torq based on the difference Diff. The functional block 107 can be for example a lookup table which returns the control value T when the control signal E is used as a lookup key. The regulator 106 can be for example a proportional "P" regulator, a proportional and integrative "PI" regulator, or a proportional, integrative, and derivative "PID" regulator.

For the sake of illustration, the operation of the above-described electromechanical power transmission chain is considered in exemplifying situations. For the sake of simplicity, the regulator 106 is assumed to be a proportional "P" regulator. First we assume that the combustion engine 111 is controlled to produce high torque, e.g. 80% of the maximum torque, and the electric energy stored by the energy-storage 118 is at a high level. Therefore, the control signal Torque_CE is high and the control value T is low. Thus, the torque reference Ref_Torq of the electric machine 110 has a high positive value and, as a corollary, the electric machine 110 acts as an electric motor that assists the combustion engine 111. Next we assume that the power control signal of the combustion engine 111 is reduced and the electric energy stored by the energy storage 118 does not have time to change substantially. As a corollary, the control signal Torque_CE gets smaller. Thus, the torque reference Ref_Torq gets smaller too, and the operation of the electric machine 110 responds to the reduction of the power control signal of the combustion engine 111. In a case where the difference Diff remains positive, the operation of the electric machine 110 responds to the reduction of the power control signal so that the torque produced by the electric machine 110 as an electric motor is reduced, whereas in a case where the difference Diff gets negative, the operation of the electric machine 110 responds to the reduction of the power control signal so that the electric machine 110 begins to act as a generator. Next we assume that the power control signal of the combustion engine 111 is increased and the electric energy stored by the energy storage 118 does not have time to change substantially. As a corollary, the control signal Torque_CE gets greater. Thus, the torque reference Ref_Torq gets greater too, and the operation of the electric machine 110 responds to the increase of the power control signal of the combustion engine 111. For example, in a case where the difference Diff was negative prior to the increase of the power control signal and the difference Diff remains negative, the operation of the electric machine 110 responds to the increase of the power control signal so that the torque produced by the electric machine 110 as a generator is reduced. For another example, in a case where the difference Diff was positive prior to the increase of the power control signal, the operation of the electric machine 110 responds to the increase of the power control signal so that the torque produced by the electric machine 110 as an electric motor is increased. For a further example, in a case where the difference Diff was negative prior to the increase of the power control signal and the difference Diff gets positive, the operation of the electric machine 110 responds to the increase of the power control signal so that the electric machine 110 changes over from generator operation to motor operation.

Next we assume that the power control signal of the combustion engine 111 is kept constant and the difference Diff is initially positive, i.e. the control value T is initially less than the control signal Torque_CE. Thus, the electric machine 110 acts as an electric motor that assists the combustion engine 111 and thereby the electric machine 110 consumes electric energy stored by the energy-storage 118. As the control value T is a decreasing function of the stored electric energy, the control value T increases and thereby the torque reference Ref_Torq decreases when the stored electric energy is consumed. As a corollary, the torque produced by the electric machine 110 as an electric motor decreases when the stored electric energy is consumed. When the stored electric energy has decreased so much that the control value T reaches the value of the control signal Torque_CE, the torque reference Ref_Torq gets zero and the electric machine 110 finishes consuming the stored electric energy. The higher is the torque produced by the combustion engine 111 i.e. the higher is the control signal Torque_CE, the lower is the amount of the stored electric energy at which the electric machine 110 finishes consuming the stored electric energy. The electric machine 110 starts to act as a generator that charges the energy-storage 118, when the power control signal of the combustion engine 111 is reduced and thereby the difference Diff and the torque reference Ref_Torq get negative.

A device according to an exemplifying and non-limiting embodiment of the invention further comprises a third input interface 105 for receiving a third control signal F. The regulator element 104 is configured to determine the form of the above-mentioned decreasing function in accordance with the third control signal F, and to change the form of the decreasing function in response to a change of the third control signal F. In the exemplifying case shown in FIG. 1, the decreasing function is according to a fraction line 108 when the control signal F has a first value, and the decreasing function is according to a fraction line 109 when the control signal F has a second value. The behavior of the electric machine 110 in response to changes of the power control signal of the combustion engine 111 can be tuned by changing the value of the control signal F.

The device 101 can be implemented with one or more processor circuits, each of which can be a programmable processor circuit provided with appropriate software, a dedicated hardware processor such as for example an application specific integrated circuit "ASIC", or a configurable hardware processor such as for example a field programmable gate array "FPGA". Furthermore, the device 101 may comprise one or more memory circuits each of which can be e.g. a random access memory circuit "RAM".

Figure 2:
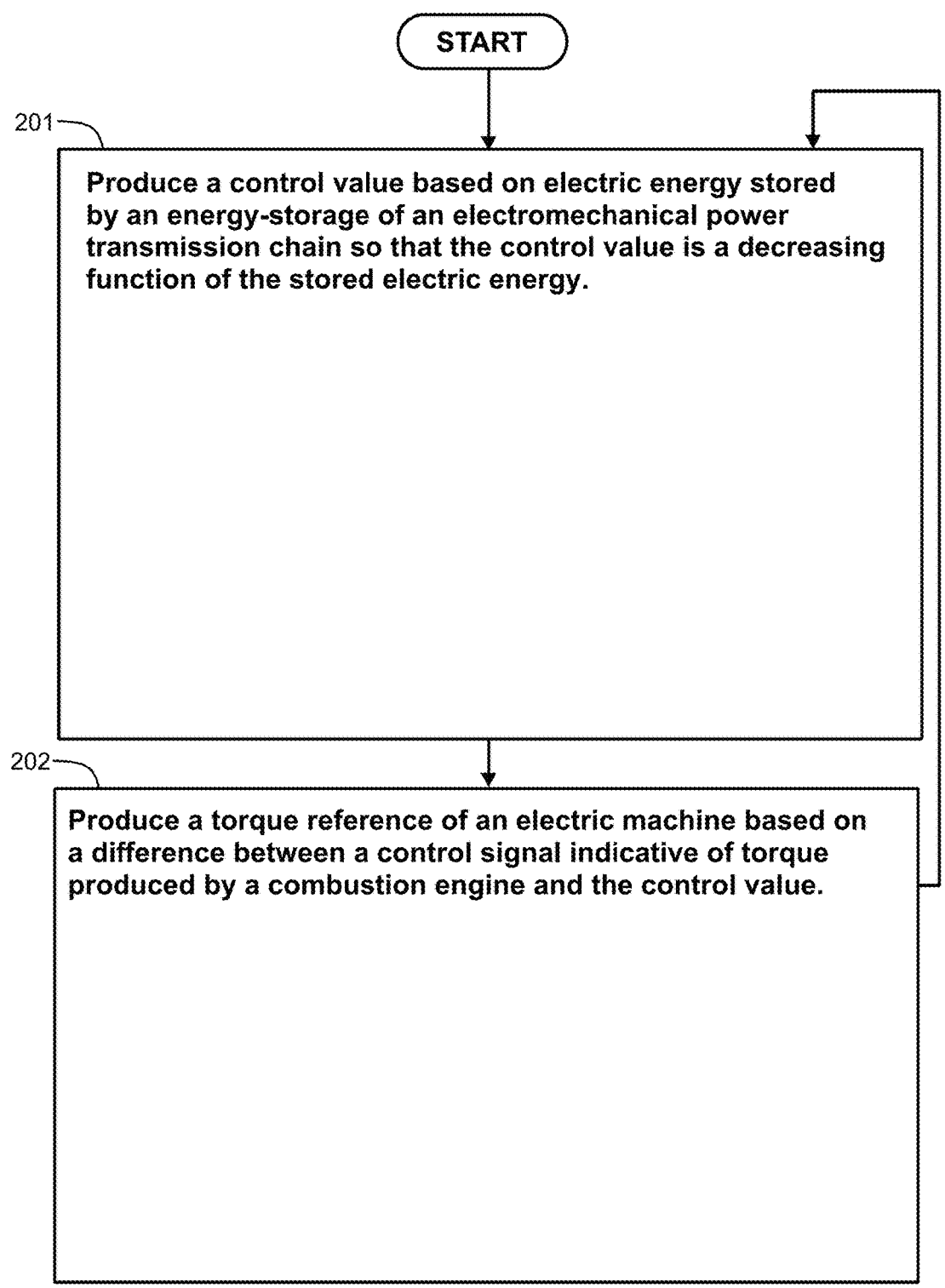
FIG. 2 shows a flowchart of a method according to an exemplifying and non-limiting embodiment of the invention for controlling an electromechanical power transmission chain.

FIG. 2 shows a flowchart of a method according to an exemplifying and non-limiting embodiment of the invention for controlling an electromechanical power transmission chain that is a parallel power transmission chain where an electric machine is mechanically connected to a combustion engine and to one or more actuators to be driven.

The method comprises the following actions:
- action 201: producing a control value based on electric energy stored by an energy-storage of the electromechanical power transmission chain so that the control value is a decreasing function of the stored electric energy, and
- action 202: producing a torque reference of the electric machine based on a difference between a control signal and the control value, the control signal being indicative of torque produced by the combustion engine.

A method according to an exemplifying and non-limiting embodiment of the invention further comprises determining the form of the decreasing function in accordance with another control signal and changing the form of the decreasing function in response to a change of the other control signal.

A computer program according to an exemplifying and non-limiting embodiment of the invention for controlling an electromechanical power transmission chain comprises computer executable instructions for controlling a programmable processor to carry out a method according to any of the above-described exemplifying and non-limiting embodiments of the invention.

A computer program according to an exemplifying and non-limiting embodiment of the invention comprises software modules for controlling an electromechanical power transmission chain that is a parallel power transmission chain where an electric machine is mechanically connected to a combustion engine and to one or more actuators to be driven.

The software modules comprise computer executable instructions for controlling a programmable processor to:
- produce a control value based on electric energy stored by an energy-storage of the electromechanical power transmission chain so that the control value is a decreasing function of the stored electric energy, and
- produce a torque reference of the electric machine based on a difference between a control signal and the control value, the control signal being indicative of torque produced by the combustion engine.

The software modules can be for example subroutines and/or functions generated with a suitable programming language.

A computer program product according to an exemplifying and non-limiting embodiment of the invention comprises a non-volatile computer readable medium, e.g. a compact disc "CD", encoded with the above-mentioned software modules.

A signal according to an exemplifying and non-limiting embodiment of the invention is encoded to carry information defining a computer program according to an embodiment of the invention.

The specific examples provided in the description given above should not be construed as limiting the applicability and/or the interpretation of the appended claims. Lists and groups of examples provided in the description given above are not exhaustive unless otherwise explicitly stated.

What is claimed is:
1. A device for controlling an electromechanical power transmission chain that is a parallel power transmission chain where an electric machine is mechanically connected to a combustion engine and to one or more actuators to be driven, the device comprising:

a first input interface for receiving a first control signal indicative of torque produced by the combustion engine,
a second input interface for receiving a second control signal indicative of electric energy stored by an energy-storage of the electromechanical power transmission chain, and
a regulator element for producing a control value based on the second control signal so that the control value is a decreasing function of the stored electric energy, and for producing a torque reference for the electric machine based on a difference between the first control signal and the control value to control the electric machine to act as: i) an electric motor and reduce a load of the combustion engine a) when there is a sufficient amount of electric energy available in the energy-storage and b) when a power of the combustion engine is above a power level providing an optimal efficiency at a prevailing rotational speed, and ii) a generator and increase the load of the combustion engine c) when the energy-storage is capable of receiving electric energy and d) when the power of the combustion engine is below the power level providing the optimal efficiency at the prevailing rotational speed.

2. A device according to claim 1, wherein the device comprises a third input interface for receiving a third control signal, and the regulator element is configured to determine a form of the decreasing function in accordance with the third control signal and to change the form of the decreasing function in response to a change of the third control signal.

3. A device according to claim 1, wherein the regulator element comprises a proportional regulator configured to produce the torque reference based on the difference between the first control signal and the control value.

4. A device according to claim 1, wherein the regulator element comprises a proportional and integrative regulator configured to produce the torque reference based on the difference between the first control signal and the control value and a time integral of the difference between the first control signal and the control value.

5. A device according to claim 1, wherein the regulator element comprises a proportional, integrative, and derivative regulator configured to produce the torque reference based on the difference between the first control signal and the control value, a time integral of the difference between the first control signal and the control value, and a time derivative of the difference between the first control signal and the control value.

6. An electromechanical power transmission chain comprising:
an electric machine mechanically connectable to a combustion engine and to one or more actuators to be driven with the electromechanical power transmission chain,
an energy-storage for storing electric energy,
converter equipment for transferring electric energy between the electric machine and the energy-storage, the converter equipment being configured to drive the electric machine as a motor or as a generator in a torque controlled mode when transferring the electric energy between the electric machine and the energy-storage and between the energy-storage device and the electric machine, and
a device for producing a torque reference of the electric machine,
wherein the device comprises:
a first input interface for receiving a first control signal indicative of torque produced by the combustion engine,
a second input interface for receiving a second control signal indicative of the electric energy stored by the energy-storage, and
a regulator element for producing a control value based on the second control signal so that the control value is a decreasing function of the stored electric energy, and for producing the torque reference for the electric machine based on a difference between the first control signal and the control value.

7. An electromechanical power transmission chain according to claim 6, wherein the converter equipment comprises:
a capacitive circuit,
a converter stage for transferring electric energy from the electric machine to the capacitive circuit when the electric machine acts as a generator and for transferring electric energy from the capacitive circuit to the electric machine when the electric machine acts an electric motor, and
a direct voltage converter for transferring electric energy between the capacitive circuit and the energy-storage so as to keep direct voltage of the capacitive circuit in a pre-determined voltage range.

8. An electromechanical power transmission chain according to claim 6, wherein the energy-storage comprises at least one electric double-layer capacitor.

9. A method for controlling an electromechanical power transmission chain that is a parallel power transmission chain where an electric machine is mechanically connected to a combustion engine and to one or more actuators to be driven, the method comprising:
producing a control value based on electric energy stored by an energy-storage of the electromechanical power transmission chain so that the control value is a decreasing function of the stored electric energy,
producing a torque reference of the electric machine based on a difference between a control signal and the control value, the control signal being indicative of torque produced by the combustion engine, and
transferring electric energy between the electric machine and the energy-storage, and driving the electric machine as a motor or as a generator in a torque controlled mode when transferring the electric energy between the electric machine and the energy-storage and between the energy-storage and the electric machine.

10. A non-transitory computer readable medium encoded with a computer program, the computer program comprising computer executable instructions for controlling a programmable processor to:
produce a control value that controls an electromechanical power transmission chain that is a parallel power transmission chain where an electric machine is mechanically connected to a combustion engine and to one or more actuators to be driven, the control value based on electric energy stored by an energy-storage of the electromechanical power transmission chain so that the control value is a decreasing function of the stored electric energy, and
produce a torque reference used for controlling for the electric machine as a motor or as a generator, the torque reference based on a difference between a control signal and the control value, the control signal being indicative of torque produced by the combustion engine.

* * * * *